INVENTOR.
ALBERT A. ELWOOD & RONALD I. CARLSON
BY Earnest Carl Edge 3,355,949
    CRYSTAL TEMPERATURE AND PRESSURE
              TRANSDUCER
Albert A. Elwood, 3310 NE. 26th Ave. 33064, and
  Ronald I. Carlson, 1710 NE. 2nd Terrace 33060,
  both of Pompano Beach, Fla.
       Filed Aug. 17, 1964, Ser. No. 390,163
              12 Claims. (Cl. 73—345)

ABSTRACT OF THE DISCLOSURE

A probe having three crystal-controlled oscillators, for measuring pressure and temperature. Two of the crystals have the same temperature-frequency characteristics, one of which is exposed to the pressure to be measured. The outputs of the oscillators are mixed to provide signals indicative of the pressure and temperature.

---

Figure 1:
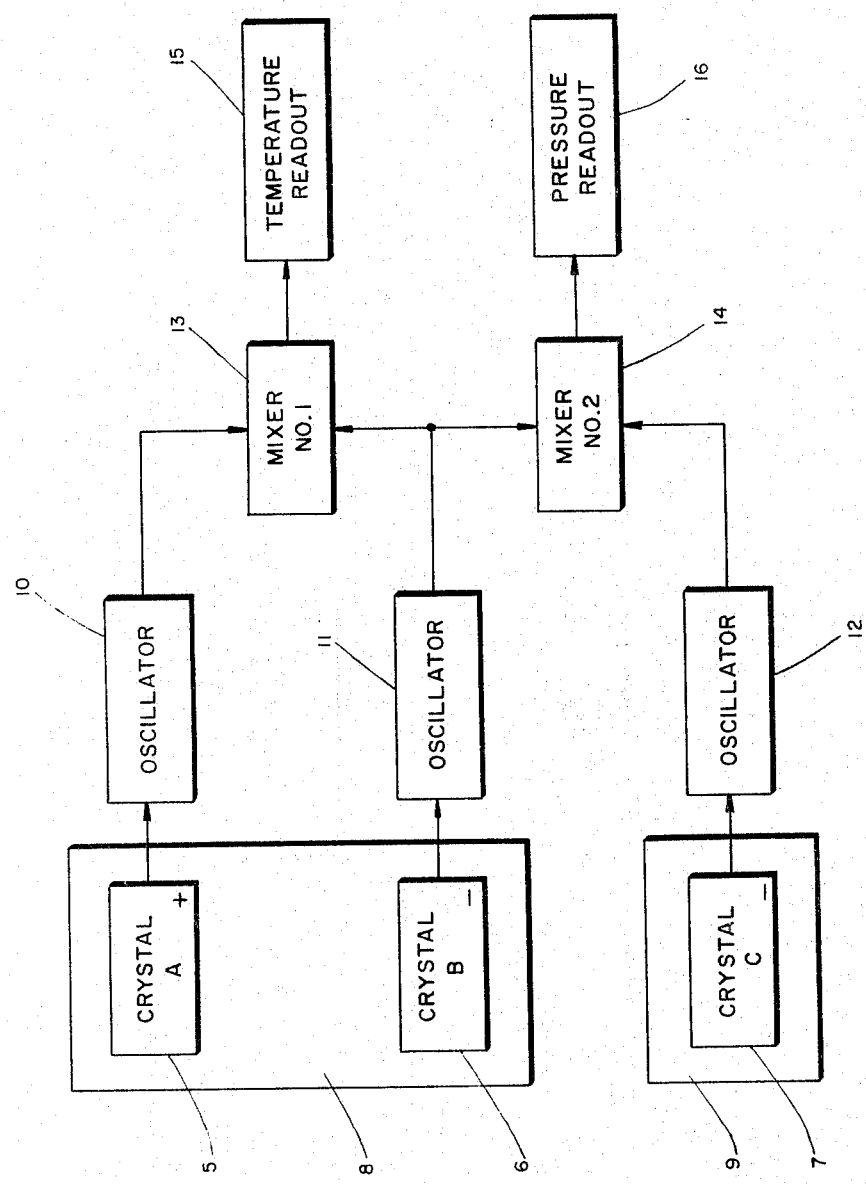

This invention relates in general to a temperature and pressure measuring device and in more particularly to a quartz crystal temperature and pressure transducer.

This application is a continuation-in-part of our co-pending application Serial No. 245,297, filed December 17, 1962, now abandoned.

In nearly all phases of oceanographic work it is essential to have accurate knowledge of both temperature and pressure at any specific location. Most depth measurements are currently made by taking advantage of the direct relationship between pressure and depth, measuring the pressure, and converting this value to depth. Instruments in use that perform this function include unprotected reversing thermometers and an electronic device utilizing a vibrating wire. The usefulness of these methods is limited by accuracy in the case of the unprotected thermometer ($\pm 5$ meters for depth less than 1000 meters), or by a tendency to long term drift in the electronic unit.

The crystal thermometer described in detail in our co-pending application referred to above consists of at least two quartz crystals, one of which is cut to have a positive temperature coefficient, the other a negative temperature coefficient. Each crystal controls the frequency of an oscillator and the output signals of the oscillators are fed into a frequency multiplier. The outputs of the frequency multipliers are mixed and the difference frequency extracted. This difference frequency is an essentially linear function of temperature.

Frequency multiplication is used to increase resolution. For example, a 10 mc. crystal might change its frequency by 1 kc. per degree of centigrade which would mean a $\Delta F$ of 1 kc. degree. However, if we multiplied the 10 mc. to 100 mc. the $\Delta F$ would now be 10 kc. The same degree of resolution could be obtained without multiplying, of course, simply by counting for a longer period of time, but this is not always convenient. A thermometer according to our co-pending application is capable of accuracies on the order of .001° C.

It is a well known and long established fact that a quartz crystal is affected by pressure and by changes in pressure. This piezoelectric effect was described by Pierre Curie in 1880 in Bulletin Society Mineralogique de France, volume 3, 1880. This bulletin discloses the fact that quartz is subject to distortion when force is applied along one of its axes and it is this tendency to distort under pressure which is the basis for pressure and/or depth measurement in our invention.

In National Bureau of Standards, Report 2390a P–12, June 1955, Perls and Kissinger disclose a means to measure pressure with crystals. A crystal is driven at its resonant frequency, and the applied voltage is measured. If mechanical stress is applied to the crystal, its resonant frequency will change resulting in a drop of the crystal impedance at the applied frequency. In the linear part of the output of this device, the output varies by 4 volts for a change of the applied steady state load of 1 kc. This device, of course, is capable of only narrow range application.

We have utilized the two phenomena described above, that the frequency of a crystal changes in response to a change in temperature, and that the frequency of a crystal changes in response to a change in pressure, and have combined them in a new and novel manner to produce a temperature and pressure transducer.

It is a primary object of the invention to provide a high precision, high resolution, electronic thermometer and pressure transducer which will give simultaneous, extremely accurate readings of temperature and pressure.

A further object of the present invention is to provide a high resolution, wide range, temperature/pressure transducer which may be utilized not only in fluid measurements but also measurements in any substance or material which lends itself to temperature and pressure measurement.

Still another object of the invention is to provide a method of measuring temperature and pressure by utilization of the frequency output and changes of frequency of temperature-sensitive and pressure-sensitive frequency-determining devices as they are subjected to various thermal and pressure conditions.

For a better understanding of the invention reference should be had to the following description and the accompanying drawing forming a part of the specification. It is to be understood that it is not intended to be exhaustive nor limiting of the invention, but on the contrary, is given for purposes of illustration in order that others skilled in the art may fully understand the invention and the principles thereof and the manner of applying it in practical use so that they may modify and adapt it in various forms, each as may be best suited to the conditions of a particular use.

Figure 2:
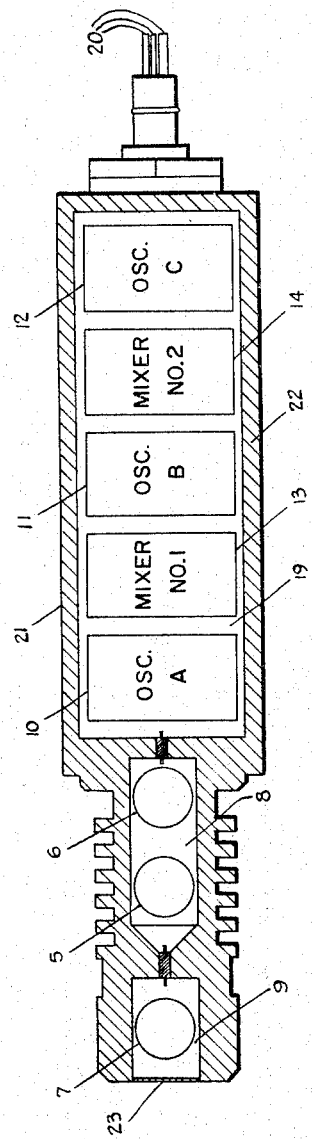

Further objects, advantages, uses, and adaptations of the invention will be apparent from the following description taken in conjunction with the accompanying drawing wherein;

FIGURE 1 is a diagrammatic representation of one form of apparatus embodying the invention; and FIGURE 2 is a cross-sectional view of a typical temperature/pressure probe with the components therein illustrated diagrammatically.

Referring now to FIGURE 1 of the drawings, the section indicated at 8 is the temperature measuring portion of the apparatus while section 9 is the pressure measuring portion.

Crystals 5 and 6 are shown as being enclosed in substantially the same environment and are protected from pressure by being enclosed in an atmosphere where the pressure remains constant at all times. They are, however, subject to the effects of temperature and temperature changes.

Crystal 7 is mounted in substantially the same environment as crystals 5 and 6 but it is mounted in such a manner that it is subject to the effects of both temperature and pressure.

For temperature-indicating purposes crystals 5 and 6 are shown as having different temperature coefficients. If crystal 5 has a positive temperature coefficient, then crystal 6 could have a negative temperature coefficient and the frequency of crystal 5 should equal the frequency of crystal 6 at some convenient temperature.

Crystal 5 controls the frequency of oscillator 10 while crystal 6 controls the frequency of oscillator 11. The output of each of oscillators 10 and 11 is fed into mixer 13 which extracts the difference frequency between oscillators 10 and 11 and said difference frequency is fed into a temperature readout 15. Readout 15 may take the form of a meter, a recorder, a combination meter and recorder, or any suitable instrument desired.

Changes of temperature in the material in which the crystals are located will change the output frequency of each of the crystals and consequently any change in output frequency will be indicated in readout 15, thereby indicating the exact temperature change of the material.

In order to prevent ambiguous readings, it is suggested that the thermometer be designed so that the convergence point, that is the temperature at which the frequency of both crystals are equal, will be below the range of interest of the thermometer. It is common in the art to design a thermometer for a specific range of temperatures, therefore, if one needed a thermometer to cover, for example, the range of zero to one hundred degrees, one would make the convergence point ten to fifteen degrees below zero so as to place the convergence point at a temperature below the range of interest.

Although probing crystal 5 is illustrated as having a positive temperature coefficient and crystal 6 is illustrated as having a negative temperature coefficient, it is within the scope of this invention to provide two crystals of the same temperature coefficient cut so that each possesses different frequency-temperature characteristics.

Crystal 7 is mounted in the same environment as crystals 5 and 6 but is separated therefrom. Whereas crystals 5 and 6 are mounted so as to be free from the effects of changes in pressure, crystal 7 is subject to both temperature and pressure changes.

Crystal 7 is cut to have the same frequency and thermal characteristic as crystal 6 and will resonate at precisely the same frequency as crystal 6 when the pressure on each crystal is the same. The effects of temperature are therefore cancelled and the difference between the two is zero. There will be no output from mixer 14 due to variations in temperature.

If, however, the unit is subjected to pressure, the output of crystal 7 will change, and there will be an output from mixer 14 equal to the difference in frequency between crystals 6 and 7. This signal will be proportional to pressure, and therefore a function of depth and may be read on pressure readout 16.

FIGURE 2 represents a typical arrangement of the several elements within a temperature/pressure probe 21.

Probe 21 is comprised of a casing 22 with three separate chambers 17, 18, and 19. Each of the chambers is provided with facilities for wiring circuitry to pass from one to the other without providing contact between the atmospheres of the separate chambers.

Mounted within chamber 17 is crystal 7 with pressure-responsive membrane 23 closing the end thereof. A liquid such as naptha is to be preferred to air as a means of exerting pressure on the crystal. If air is used then heating or cooling due to compression or expansion will affect the frequency of the crystal. The effect of a thermal change might mask the effects of pressure. On the other hand a liquid is essentially free of compression under pressure and will undergo no significant adiabatic temperature change as pressure is applied. Experiments have indicated that a crystal will oscillate in most non-conductive fluids.

Crystal 7 is connected by suitable wiring to oscillator 12 and then to mixer 14 as shown in FIGURE 1.

Inside chamber 18 are crystals 5 and 6. This chamber is sealed off from chambers 17 and 19 so as not to be affected by the pressure in each of these chambers. As shown in FIGURE 1, crystal 5 is connected to oscillator 10 and mixer 13 while crystal 6 is connected to oscillator 11, mixer 13 and mixer 14.

Mixers 13 and 14 are connected through suitable wiring to readouts through prongs 20 at one end of probe 21.

Throughout this specification the word crystal has been used to indicate a temperature-responsive, pressure-responsive frequency-determining device and is used for illustrative rather than limiting purposes. A routineer in the art may substitute any temperature-responsive, pressure-responsive frequency-determining devices for the crystals and still be within the area of invention covered herein.

Further, as no novelty in the circuitry is claimed a person skilled in the art may add or subtract oscillators, filters, multipliers, mixers, and other common circuit components without affecting the inventive content of this disclosure.

Although only one embodiment of the invention has been described it will be understood that in some respects this embodiment is only illustrative and that the invention is susceptible of application in a variety of other forms within the spirit and scope of the appended claims.

What is claimed is:

1. The method of measuring temperature and pressure including the steps of
    (a) inserting at least two temperature-responsive, pressure-responsive frequency generating devices of known frequency-temperature characteristics into the material being measured,
    (b) protecting said devices from the effects of pressure,
    (c) inserting a third temperature-responsive, pressure-responsive frequency generating device of the same frequency-temperature characteristics as one of said first devices into the material being measured,
    (d) exposing said third device to the effects of both temperature and pressure,
    (e) interpreting the frequency outputs of said first two devices to indicate the temperature of the material, and
    (f) interpreting the frequency output of said third device and its like counterpart of the first two devices to indicate the pressure of the material.

2. The method of measuring temperature and pressure including the steps of
    (a) inserting at least two quartz crystals of known frequency-temperature characteristics into the material being measured,
    (b) protecting said crystals from the effects of pressure,
    (c) exposing said crystals to the effects of temperature,
    (d) inserting a third quartz crystal of the same frequency-temperature characteristics of one of said first crystals,
    (e) exposing said third crystal to the effects of both temperature and pressure,
    (f) mixing the output frequencies of oscillators controlled by each of the first two crystals and interpreting the difference frequency to indicate the temperature of the material, and
    (g) mixing the output frequencies of oscillators controlled by the third crystal and the crystal of the first two which has the same frequency-temperature characteristics as said third crystal and interpreting the difference frequency to indicate the pressure of the material.

3. The method of measuring temperature and pressure including the steps of
    (a) inserting a quartz crystal having a positive temperature coefficient and a quartz crystal having a negative temperature coefficient into the material being measured,
    (b) protecting each of said crsytals from the effects of pressure,
    (c) exposing each of said crystals to the effects of temperature,
    (d) inserting a third quartz crystal having the same frequency-temperature characteristics of one of said first two crystals into the material being measured, (e) exposing said third crystal to the effects of both temperature and pressure, (f) supplying each of said crystals with an oscillator, (g) mixing the output frequencies of the oscillators controlled by each of the first two crystals and interpreting the difference frequency to indicate the temperature of the material, and (h) mixing the output frequencies of the oscillators controlled by the third crystal and the crystal of the first two which has the same frequency-temperature characteristics as said third crsytal and interpreting the difference frequency to indicate the pressure of the material.

4. The method of measuring temperature and pressure including the steps of (a) inserting a quartz crystal having a positive temperature coefficient and a quartz crystal having a negative temperature coefficient into the material being measured, (b) protecting each of said crystals from the effects of pressure, (c) exposing each of said crystals to the effects of temperature, (d) inserting a third quartz crystal having the same positive temperature coefficient as said first quartz crystal into the material being measured, (e) exposing said third crystal to the effects of both temperature and pressure, (f) supplying each of said crystals with an oscillator, (g) mixing the output frequencies of the oscillators controlled by each of the first two crystals and interpreting the difference frequency to indicate the temperature of the material, and (h) mixing the output frequencies of the oscillators controlled by said first quartz crystal having a positive temperature coefficient and said third quartz crystal and interpreting the difference frequency to indicate the pressure of the material.

5. The method of measuring temperature and pressure including the steps of (a) inserting a quartz crystal having a positive temperature coefficient and a quartz crystal having a negative temperature coefficient into the material being measured, (b) protecting each of said crystals from the effects of pressure, (c) exposing each of said crystals to the effects of temperature, (d) inserting a third quartz crystal having the same negative temperature coefficient as said first quartz crystal into the material being measured, (e) exposing said third crystal to the effects of both temperature and pressure, (f) supplying each of said crystals with an oscillator, (g) mixing the output frequencies of the oscillators controlled by each of the first two crystals and interpreting the difference frequency to indicate the temperature of the material, and (h) mixing the output frequencies of the oscillators controlled by said first quartz crystal having a negative temperature coefficient and said third crystal and interpreting the difference frequency to indicate the pressure of the material.

6. An apparatus for measuring temperature and pressure comprising (a) at least two temperature-responsive, pressure-responsive frequency generating devices of known frequency-temperature characteristics, (b) said devices being enclosed so as not to be affected by pressure, (c) a third temperature-responsive, pressure-responsive frequency generating device of the same frequency-temperature characteristics as one of said first devices, (d) said third device exposed so as to be affected by both temperature and pressure, (e) a mixer for mixing the frequency outputs of said first two devices, (f) a readout device for reading the output of said mixer, (g) a second mixer for mixing the frequency output of said third device and its like counterpart of the first two devices, and (h) a readout device for reading the output of said second mixer.

7. A temperature/pressure measuring device comprising (a) at least two quartz crystals of known frequency-temperature characteristics, (b) said crystals protected from the effects of pressure, (c) said crystals exposed so as to be affected by temperature, (d) a third quartz crystal of the same frequency-temperature characteristics of one of said first crystals, (e) said third crystal being exposed so as to be affected by both temperature and pressure, (f) an oscillator controlled by each of the three crystals, (g) a mixer for mixing the output frequencies of the oscillators of each of the first two crystals, (h) a readout connected to said mixer for reading the difference frequency output of said mixer, (i) a second mixer for mixing the output frequencies of the oscillators controlled by the third crystal and the crystal of the first two crystals which has the same frequency-temperature characteristics as said third crystal, and (j) a readout device connected to said second mixer.

8. An apparatus for measuring temperature and pressure comprising (a) a quartz crystal having a positive temperature coefficient, (b) a quartz crystal having a negative temperature coefficient, (c) each of said crystals shielded from the effects of pressure, (d) each of said crystals exposed to the effects of temperature, (e) a third quartz crystal having the same frequency-temperature characteristics as one of said first two crystals, (f) said third crystal exposed to the effects of both temperature and pressure, (g) each of said crystals controlling a separate oscillator, (h) a mixer connected to the oscillators controlled by each of the first two crystals, (i) a readout connected to said mixer, (j) a second mixer connected to the oscillator controlled by the third crystal and the oscillator controlled by the crystal of the first two which has the same frequency-temperature characteristics as said third crystal, and (k) a readout connected to said second mixer.

9. A temperature and pressure measuring device comprising (a) a quartz crystal having a positive temperature coefficient, (b) a quartz crystal having a negative temperature coefficient, (c) each of said crystals placed together in a pressure-resistant atmosphere, (d) said atmosphere being subjected to temperature and temperature changes, (e) a third quartz crystal having the same positive temperature coefficient as said first quartz crystal, (f) said third crystal exposed to the effects of both temperature and pressure, (g) each of said crystals controlling an oscillator, (h) a mixer connected to the oscillators controlled by each of the first two crystals, (i) a readout connected to said mixer,
(j) a second mixer connected to the oscillator controlled by the first quartz crystal having a positive temperature coefficient and the oscillator controlled by said third crystal, and
(k) a readout connected to said second mixer.

10. A temperature and pressure measuring device comprising
(a) a quartz crystal having a positive temperature coefficient,
(b) a quartz crystal having a negative temperature coefficient,
(c) each of said crystals placed together in a pressure-resistant atmosphere.
(d) said atmosphere being subjected to temperature and temperature changes,
(e) a third quartz crystal having the same negative temperature coefficient as said first quartz crystal,
(f) said third crystal exposed to the effects of both temperature and pressure,
(g) each of said crystals controlling an oscillator,
(h) a mixer connected to the oscillators controlled by each of the first two crystals,
(i) a readout connected to said mixer,
(j) a second mixer connected to the oscillator controlled by the first quartz crystal having a negative temperature coefficient and the oscillator controlled by said third crystal, and
(k) a readout connected to said second mixer.

11. A temperature/pressure probe comprising
(a) a plurality of chambers,
(b) each of said chambers being independent of the others except for wiring contacts therebetween,
(c) a quartz crystal located in a first chamber of said plurality of chambers,
(d) said first chamber having a resilient pressure-sensitive wall,
(e) said crystal being connected to an oscillator in a second chamber of said plurality of chambers remote from said first chamber,
(f) a plurality of crystals located in a third chamber of said plurality of chambers,
(g) said third chamber being filled with a non-conductive fluid,
(h) each of the crystals located in said third chamber being connected to its own oscillator in said second chamber,
(i) a plurality of mixers in said second chamber with each of said mixers having two of said oscillators connected thereto, and no two mixers having the same pair of oscillators connected thereto, and
(j) a plurality of prongs in contact with said mixers in said second chamber and extending outside the casing of said probe.

12. A temperature/pressure probe comprising the elements of claim 11 with
(k) the casing of said probe being made of a heat-conducting material so that all crystals therein are affected by temperature and changes of temperature in the atmosphere surrounding said probe.

References Cited
UNITED STATES PATENTS 2,017,859    10/1935    Halstead _____ 236—15
3,274,828    9/1966    Pulvari _____ 73—398

FOREIGN PATENTS 529,035    8/1956    Canada.

LOUIS R. PRINCE, *Primary Examiner.*
DAVID SCHONBERG, *Examiner.*
FREDERICK SHOON, *Assistant Examiner.*